Patented Mar. 22, 1932

1,850,155

UNITED STATES PATENT OFFICE

GUSTAV REDDELIEN, OF LEIPZIG, AND GEORG MATZDORF AND ALFRED PETERS, OF DESSAU IN ANHALT, GERMANY, ASSIGNORS TO GENERAL ANILINE WORKS, INC., OF NEW YORK, N. Y., A CORPORATION OF DELAWARE

PRODUCING DISCHARGEABLE DYEINGS ON ACETATE SILK

No Drawing. Application filed May 15, 1930, Serial No. 452,808, and in Germany May 23, 1929.

Our present invention relates to a new process of producing dischargeable dyeings on acetate silk; one of its objects are the threads of acetate silk or the fabrics made of acetate silk dyed according to our new process.

We have found that dark green, navy blue and black shades which can be discharged white, are obtainable on acetate silk by dyeing it with a dye of the general formula:

$$(4) H_2N-R-N=N-R'-N{\binom{X}{X}}(4')$$

wherein R represents a phenyl radical, substituted or not by halogen, alkyl, alkoxyl or several of these groups; R' a phenyl radical or naphthyl radical, substituted or not by halogen or alkyl, and X an aliphatic radical, such as $CH_3$, $C_2H_5$, $CH_2CH_2OH$, diazotizing these dyes on the fiber and developing them with 2-hydroxynaphthalene-3-carboxylic acid. The dyes necessary to this end can be obtained in known manner by coupling the corresponding nitroaminodiazo or acylamino diazo compounds with the tertiary amines and subsequently reducing the nitro-group or splitting off the acyl radical.

Thus the monoazo tertiary amino compounds in question may be made according to or in analogy with the process disclosed in the Journal of the Chemical Society, vol. 45, page 107.

The following examples illustrate the invention:

*Example 1.*—1 kilo of acetate silk is put into a bath containing 30 liters of water,
20 grams of the dye of the following constitution:

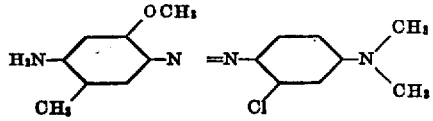

90 grams of soap.

The dye mentioned above is rather difficultly soluble in alcohol. Recrystallized from ethyl alcohol it forms small red-brown crystals or a red powder when pulverized. It melts at 177° C.

The dye is first made into a paste with some water, if necessary, while adding some soap or any other emulsifying agent, and then entered into the dyeing bath mixed with soap. In the dyeing bath the material is treated for about three quarters of an hour starting at about 40° C. and then gradually raising the temperature to 70° C. Then the material is rinsed and diazotized during 20 to 30 minutes in a fresh cold bath consisting of 30 liters of water, 60 grams of sodium nitrite, and 150 grams of hydrochloric acid of 20° Bé. After diazotizing the material is well rinsed and developed in a bath containing 60 g. of 2-hydroxynaphthalene-3-carboxylic acid for 30 liters of water. Next the requisite quantity of hydroxynaphthalenecarboxylic acid is dissolved by boiling while adding twice the quantity of sodium acetate and the solution is added to the developing bath. In this developing bath the material is treated for about half an hour, entering it in the lukewarm bath and raising the temperature of the latter slowly to 60° C.

A deep dark-green is obtained which can be discharged by the usual reduction discharges, for instance, pure white by the mono zinc salt of the formaldehyde sulfoxylic acid.

*Example 2.*—Dyeing is carried out according to the method indicated in Example 1, by substituting 40 g. of the dye of the following constitution:

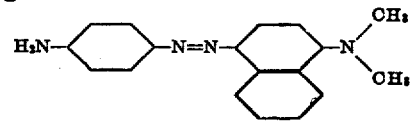

for the dye used in said example.

This dye is considerably soluble in ethyl alcohol; recrystallized therefrom it forms bronze-colored crystals which may be pulverized to form a yellow-brown powder. It melts at about 107° C. The shade obtained is a deep marine blue having a very good dischargeability.

Example 3.—For dyeing 1 kg. of acetate silk, the dyeing bath containing about 30 liters of water, is prepared with 12 grams of the dye of the following constitution:

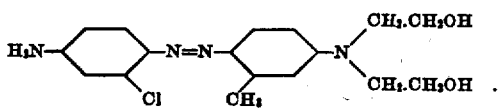

This dye is easily soluble in alcohol from a hot concentrated solution. It crystallizes in form of small red-brown crystals which pulverized form a red powder. It melts at 171 to 172° C. The dye is dissolved by pouring over it the same or 1½ its weight of hydrochloric acid of 20° Bé. Then the solution obtained is added to the dyeing bath. The material is entered in the lukewarm bath; the temperature is then raised to 60 to 70° C. within ¼ hour. For better exhausting the bath another 150 to 200 grams of sodium acetate are subsequently added. After about ½ hour the material is rinsed and diazotized and developed in the manner indicated in Example 1.

A black shade with a bluish hue is obtained giving good white effects with the usual reduction discharges.

Example 4.—The operation is the same as in Example 1, with the difference only that the dye indicated therein is substituted by that of the following constitution:

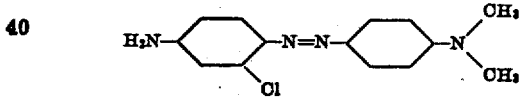

For producing a black shade on 1 kg. of acetate silk, about 15 grams of the dye are required.

The dye of the formula given is considerably soluble in alcohol; after recrystallization from that solvent it forms dark red-brown crystals of a metallic luster. In the finely pulverized state it forms a yellow-brown powder. It melts at 147° C.

The shade obtained can very well be discharged white with the mono zinc salt of formaldehyde-sulfoxylic acid.

What we claim is:—

1. The process of producing dischargeable dyeings on acetate silk, which comprises dyeing it with a dye of the general formula:

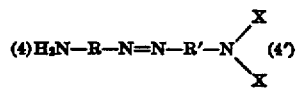

wherein R represents a phenyl radical substituted or not by halogen, alkyl or alkoxyl, R' a phenyl or naphthyl radical substituted or not by halogen or alkyl, and X stands for methyl, ethyl or hydroxyethyl, diazotizing the dye on the fiber and developing it with 2-hydroyxnaphthalene-3-carboxylic acid.

2. The process of producing dischargeable dyeings on acetate silk, which comprises dyeing it with a dye of the general formula:

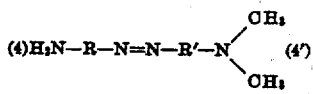

wherein R represents a phenyl radical substituted or not by halogen, alkyl or alkoxyl, R' a phenyl or naphthyl radical substituted or not by halogen or alkyl, diazotizing the dye on the fiber and developing it with 2-hydroxynaphthalene-3-carboxylic acid.

3. The process of producing dischargeable dyeings on acetate silk, which comprises dyeing it with a dye of the general formula:

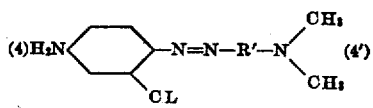

wherein R' respresents a phenyl or naphthyl radical substituted or not by halogen or alkyl, diazotizing the dye on the fiber and developing it with 2-hydroxynaphthalene-3-carboxylic acid.

4. The process of producing dischargeable dyeings on acetate silk, which comprises dyeing it with a dye of the general formula:

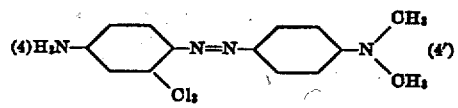

diazotizing the dye on the fiber and developing it with 2-hydroxynaphthalene-3-carboxylic acid.

5. Artificial filaments consisting of acetate silk dyed in dark green, navy blue to black shades, these dyeings being dischargeable with the mono zinc salt of the formaldehyde sulfoxylic acid, said shade being effected by a dye of the general formula:

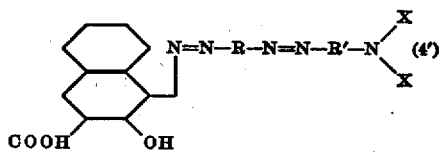

wherein R represents a phenyl radical substituted or not by halogen, alkyl or alkoxyl, R' a phenyl or naphthyl radical substituted or not by halogen or alkyl, and X stands for methyl, ethyl or hydroxyethyl.

6. Artificial filaments consisting of acetate silk dyed in black shades, this dyeing being dischargeable with the mono zinc salt of the formaldehyde sulfoxylic acid, said shade being effected by a dye of the general formula:

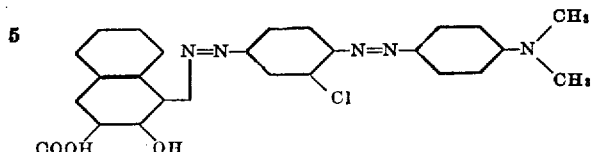

In testimony whereof, we affix our signatures.

GUSTAV REDDELIEN.
GEORG MATZDORF.
ALFRED PETERS.

CERTIFICATE OF CORRECTION.

Patent No. 1,850,155.   March 22, 1932.

GUSTAV REDDELIEŃ ET AL.

It is hereby certified that error appears in the printed specification of the above numbered patent requiring correction as follows: Page 2, claims 3 and 4, in the formulas, for the symbols "CL" and "Cl$_3$" respectively, read Cl; and that the said Letters Patent should be read with these corrections therein that the same may conform to the record of the case in the Patent Office.

Signed and sealed this 5th day of July, A. D. 1932.

(Seal)

M. J. Moore,
Acting Commissioner of Patents.

formaldehyde sulfoxylic acid, said shade being effected by a dye of the general formula:

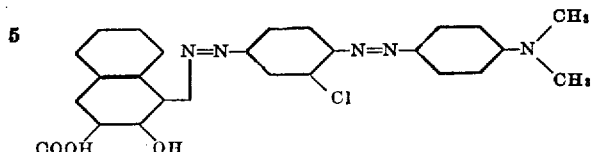

In testimony whereof, we affix our signatures.

GUSTAV REDDELIEN.
GEORG MATZDORF.
ALFRED PETERS.

CERTIFICATE OF CORRECTION.

Patent No. 1,850,155.   March 22, 1932.

GUSTAV REDDELIEŃ ET AL.

It is hereby certified that error appears in the printed specification of the above numbered patent requiring correction as follows: Page 2, claims 3 and 4, in the formulas, for the symbols "CL" and "$Cl_3$" respectively, read Cl; and that the said Letters Patent should be read with these corrections therein that the same may conform to the record of the case in the Patent Office.

Signed and sealed this 5th day of July, A. D. 1932.

(Seal)

M. J. Moore,
Acting Commissioner of Patents.

CERTIFICATE OF CORRECTION.

Patent No. 1,850,155.             March 22, 1932.

GUSTAV REDDELIEN ET AL.

It is hereby certified that error appears in the printed specification of the above numbered patent requiring correction as follows: Page 2, claims 3 and 4, in the formulas, for the symbols "CL" and $Cl_3$" respectively, read Cl; and that the said Letters Patent should be read with these corrections therein that the same may conform to the record of the case in the Patent Office.

Signed and sealed this 5th day of July, A. D. 1932.

(Seal)                                      M. J. Moore,
                                           Acting Commissioner of Patents.